Dec. 14, 1926.  1,610,731
L. B. BARTH
WHEEL AND TREAD STRUCTURE
Filed Sept. 22, 1924    3 Sheets-Sheet 1
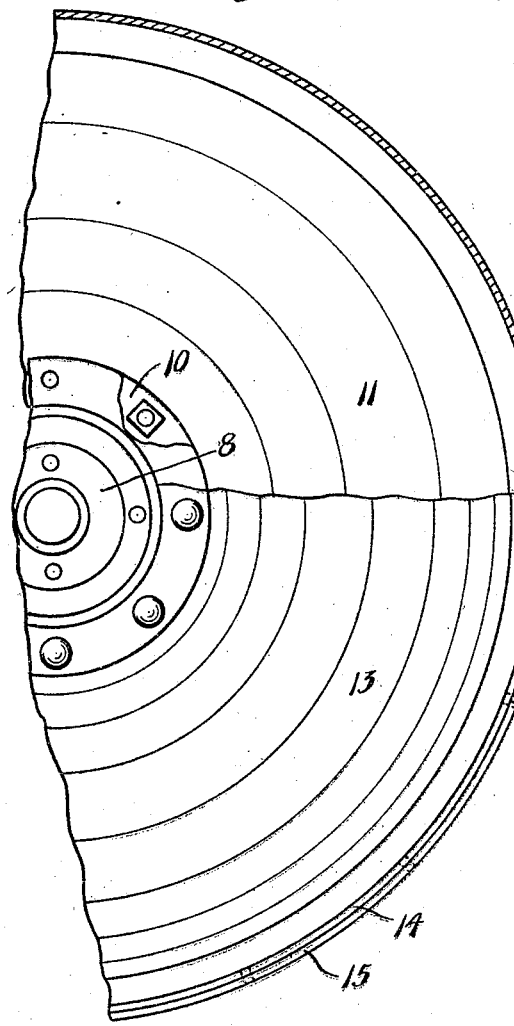
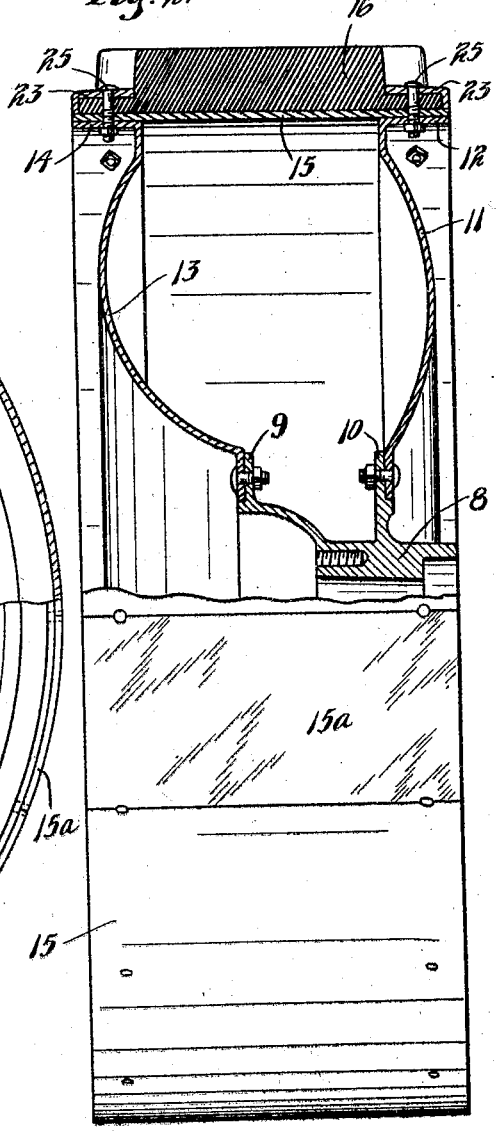
INVENTOR.
LUTHER B. BARTH,
BY HIS ATTORNEY.

Dec. 14, 1926.
L. B. BARTH
1,610,731
WHEEL AND TREAD STRUCTURE
Filed Sept. 22, 1924
3 Sheets-Sheet 2
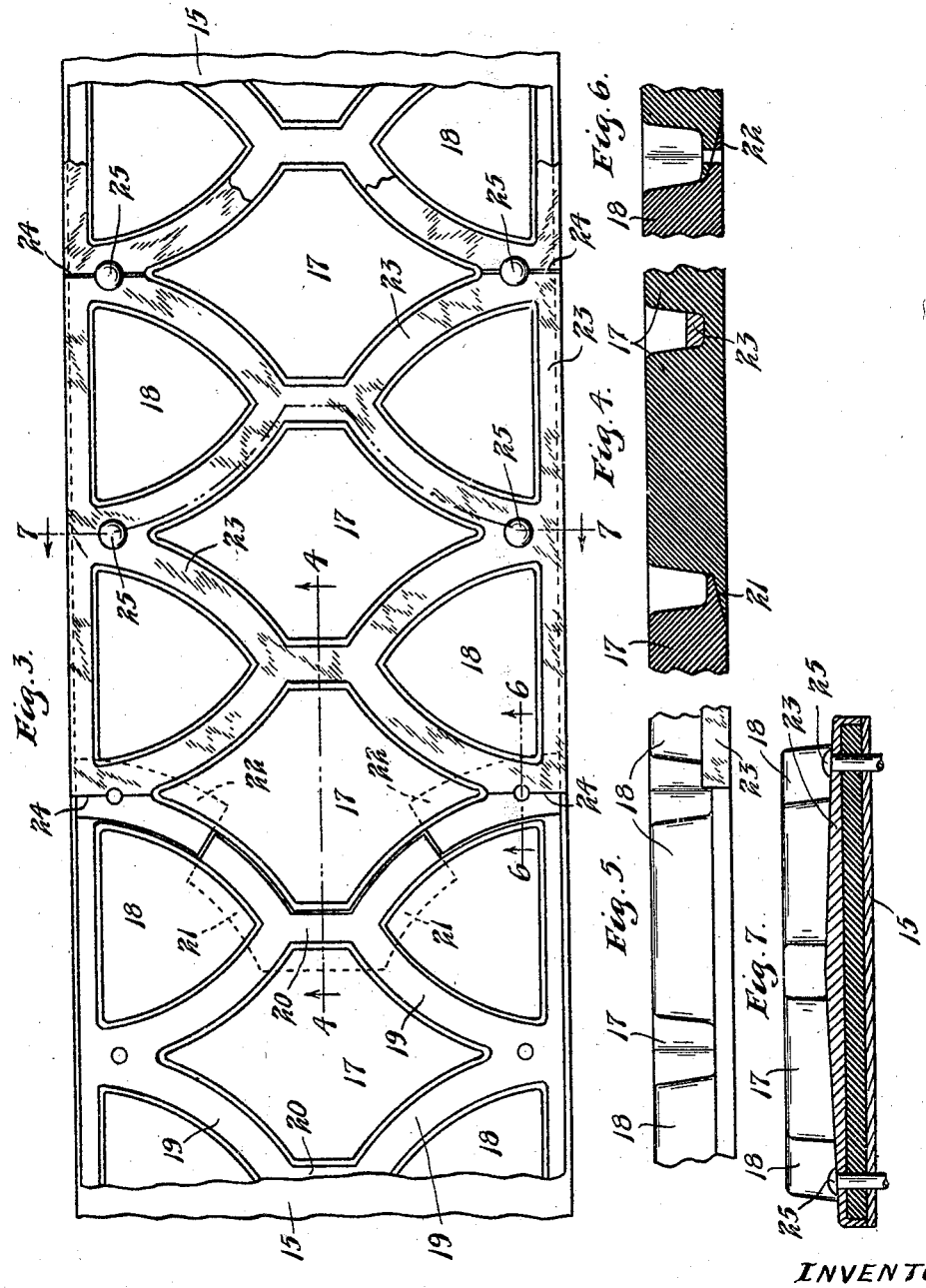
INVENTOR.
LUTHER B. BARTH.
BY HIS ATTORNEY.

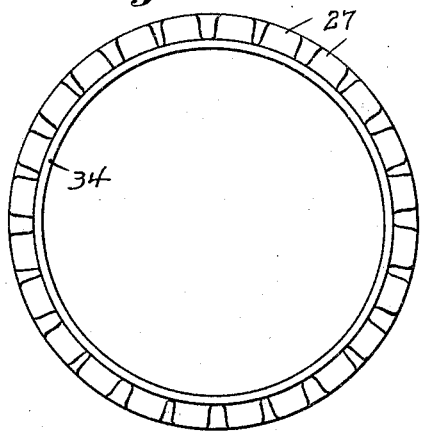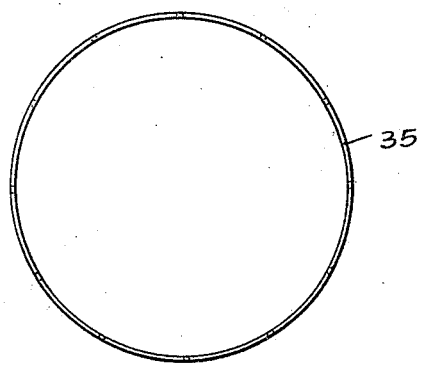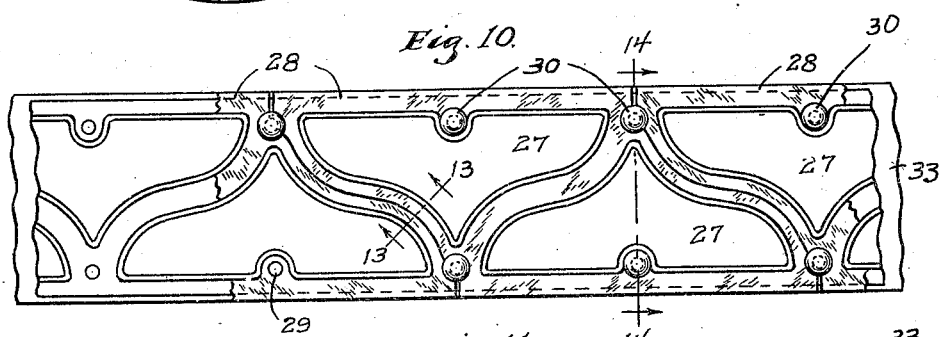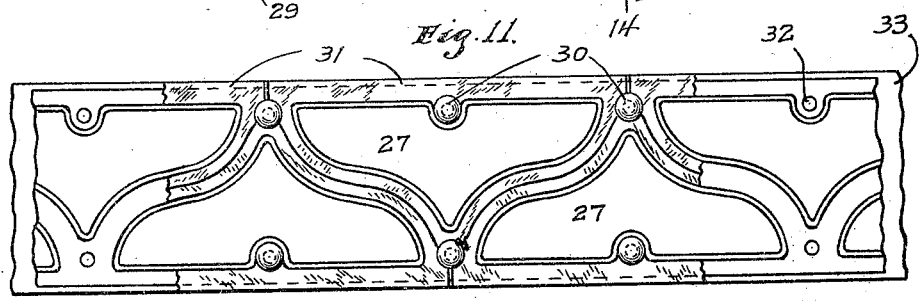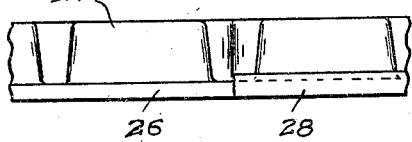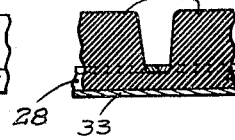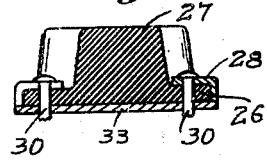

Patented Dec. 14, 1926.

1,610,731

UNITED STATES PATENT OFFICE.

LUTHER B. BARTH, OF ST. PAUL, MINNESOTA.

WHEEL AND TREAD STRUCTURE.

Application filed September 22, 1924. Serial No. 739,014.

This invention relates to a wheel and tread structure, and particularly to a wheel of the disk type adapted to be filled with some heavy material and so constructed that it will efficiently and conveniently carry a tread device for heavy usage. While a wheel of the type of the present invention can be used in various places, it particularly is designed for use on tractors or similar machines used in road work and on roads. With such machines it is often desirable to have great weight and it has become more or less common practice to fill the wheels with heavy material. It is also desirable in such a wheel to have a tread having great gripping and traction power, and at the same time being adapted for rough and heavy use. One form of tread which has been proposed is that having central and lateral projecting portions divided by intersecting grooves extending diagonally across the tread in opposite directions. With such a tread it has been found that the rectilinear grooves tend to pick up sticks or other straight objects which are retained in the grooves. Such treads with straight grooves often have difficulty in crossing railroad tracks which extend at an angle to the road which is substantially the angle of the grooves. The grooves embrace the rails and the tread is often pulled loose by the rails.

It is an object of this invention, therefore, to provide a wheel having a tread thereon with projections divided by grooves, which grooves have curved portions.

It is a further object of the invention to provide a tread having centrally and laterally disposed projections separated by grooves which have intersecting or common portions extending transversely of the tread and the other portions formed as reversely extending curves.

It is also an object of the invention to provide a wheel having such a tread, as above set forth, which is held in place and secured to the member either by openwork segmental sections disposed in said grooves or by a continuous openwork annular member.

It is still further an object of the invention to provide a wheel having such a tread and securing means, as set forth, which can also be filled with heavy material and which is especially constructed to carry such a tread as above set forth.

These and other objects and advantages of the invention will be fully set forth in the following description made in connection with the accompanying drawings in which like reference characters refer to the same parts throughout the different views, and in which, Fig. 1 is a view in side elevation of a portion of the wheel certain parts being removed;

Fig. 2 is a view showing in part an edge or face of the wheel in elevation, certain portions being broken away and other portions shown in vertical section;

Fig. 3 is a developed plan view of a portion of the tread of the wheel, the openwork securing means being removed in a portion of said view;

Fig. 4 is a vertical section taken on the line 4—4 of Fig. 3;

Fig. 5 is a partial view in side elevation of parts shown in Fig. 3;

Fig. 6 is a vertical section on the line 6—6 of Fig. 3;

Fig. 7 is a vertical section taken on the line 7—7 of Fig. 3;

Fig. 8 is a view in end elevation of a continuous tread member;

Fig. 9 is a view in side elevation of a continuous securing member for the tread;

Fig. 10 is a plan view of a portion of the wheel showing a modified form of tread and fastening means;

Fig. 11 is a view similar to Fig. 10 showing a further modification;

Fig. 12 is a partial view in side elevation of parts seen in Fig. 11;

Fig. 13 is a view in vertical section on the line 13—13 of Fig. 10, as indicated by the arrows; and Fig. 14 is a view in vertical section taken on the line 14—14 of Fig. 10, as indicated by the arrows.

Referring to the drawings, a wide wheel is shown comprising a hub 8 bored to be suitably mounted on a tractor or other machine, which hub has spaced annular flanges 9 and 10 extending therefrom in planes at right angles to the axis of the wheel, said flanges having annular shoulders formed thereon. An outwardly curved disk 11 is secured to the flange 10. said disk having an annular inner flange abutting the shoulder on flange 10 so as to lie flush with the outer side of said flange and said disk has an outer flange 12 annular in shape and disposed substantially parallel with the axis of the wheel, said latter flange having a series of spaced holes extending radially therethrough. It will be noted that flange 9 is disposed a considerable distance from one side of the wheel and this flange has secured thereto a disk 13 having a curved intermediate portion, said disk also having an inner annular flange abutting against the shoulder on flange 9 and lying flush with the outer side of said flange and one side of hub 8. The disk 13 also has an outer annular flange 14 extending substantially parallel with the axis of the wheel and of the same diameter as flange 12, which flange 14 also has a series of spaced holes extending radially therethrough. A rim member 15, illustrated as formed of a plate, extends about the flanges 12 and 14 and is flush with the outer edges thereof. The ends of the rim 15 are spaced and a segmental plate 15$^a$ disposed therebetween to make a complete rim about the wheel. It will be noted that the ends of plate 15$^a$ which extend transversely across the wheel extend centrally through holes formed in members 15 and 15$^a$. The member 15 also has a series of spaced holes at each side alined with the holes through the flanges 12 and 14.

The rim formed by members 15 and 15$^a$ has mounted thereon a tread member designated generally as 16. This tread member extends continuously around the rim but is split at one point and extends under the adjacent end of the tread, in a manner which will be later described. The tread member 16 is provided with projections 17 disposed centrally of the tread and with projections 18 disposed laterally of the tread. The projections 17 and 18 are separated by grooves 19. It will be seen from Fig. 3 that the projecting portions 18 are in the shape of pointed arches which are pointed inwardly and which have straight bases extending parallel to the sides of the tread. The grooves 19 being parallel to the curved sides of the projections 18 also form, in effect, curved arches with the points directed inwardly and said grooves are connected by a common portion 20. The remote sides of the adjacent projections 18 are formed substantially on the arc of a circle, the center of which, in the particular embodiment of the invention illustrated, lies substantially in one side edge of the rim. It follows that the corresponding sides of the groove 19 are also formed on such an arc. If, however, the projections 18 were made of a different size said center would be at one side of said edge. The grooves could be said to intersect at the common portion 20 and each consists of end portions which are reversely curved. The central portions 17 thus have pointed sides which are concave and have short end portions which are straight. The tread is divided, as shown at the left hand end of Fig. 3, along lines parallel in part to the grooves 19. One end of the tread has a central projection 21 extending therefrom which is beveled substantially to a sharp edge and underlies the adjacent portion of the other end. This latter end has laterally projecting portions 22 which, likewise, are beveled substantially to a sharp edge and underlie the adjacent portions of the first mentioned end. The tread portion 16, as shown in Figs. 2, 3 and 7, does not extend entirely to the side edges of the rim members 15 and 15$^a$. As shown in the various figures, the projections 17 and 18 are tapered outwardly on all sides.

The tread 16 is held in place by a series of segmental open-work plates 23, said plates having ribs adapted to be disposed in the grooves 19 and being divided along the end portions 24. These plates 23, as shown in Fig. 7, are thickest at the center of the tread and taper toward the edges and are provided with inwardly extending flanges at their outer sides embracing the side edges of tread 16 and which lie flush with the edges of the rim and flanges 12 and 14. The segmental members 23 are also provided with a plurality of holes circumferentially spaced at each side thereof, which holes are alined with the holes extending through flanges 12 and 14 and the rim members 15 and 15$^a$ and also with holes extending through the sides of the tread member 16. It will be noted that the end portions 24 of the plates 23 extend diametrically of certain of these holes. Headed bolts 25 extend through said holes and are provided with nuts at the inner side of members 12 and 14. These bolts thus secure the disk members 11 and 13 to the rim members 15 and 15$^a$ and also secure the plates 23 and the tread member 16 to said rim. It will be noted that one bolt disposed at the ends of plates 23 holds two plates in position. When the bolts 25 are in place, the wheel is firmly held together as a rigid unit, all of the parts being supported from the hub 8.

From the above description it is thought the assembly of the wheel will be clear. When the split tread is used, the rim portions 15 and 15$^a$ can be placed in position on the disks 11 and 13 after the latter have been bolted to hub 8. The tread can then be placed around the rim and the plates 23 placed thereon and the parts secured together by the insertion and tightening of bolts 25. The wheel is then completely assembled. With a tread provided as illustrated, the dividing line of said tread will be placed adjacent one end of the segment 15$^a$ of the rim. When it is desired to fill the wheel, certain of the bolts 25 can be removed and one segmental plate 23 removed. The one end of the tread 16 can then be folded back and the segment 15ª removed which will expose the interior chamber of the wheel which can then be filled, after which, the plate 15ª, end of tread 16 and segmental plate 23 can again be secured in position. The wheel, of course, will be emptied when desired in the same manner.

When a narrow wheel is used the form of tread member shown in Figs. 10 to 14, preferably, will be used. This tread member comprises a flat base portion 26 with similar projections 27 projecting radially therefrom. The projections 27 are separated by grooves passing in a general diagonal direction across the tread, which grooves merge at their end portions adjacent the edges of the tread. It will be noted that each of the grooves comprises reversely curved end portions and a central rectilinear portion forming a common tangent to said reversely curved portions. The adjacent grooves are reversely disposed. The projections 27 therefore have rectilinear side or base portions extending parallel to the edge of the tread and have curved side portions parallel with the grooves which meet in a point. The adjacent projections 27 are also reversely disposed. The tread shown in Fig. 10 is also adapted to be held in place on the rim by open work members 28 having straight outer side portions adapted to overlie the flanges at the sides of the tread 26 and having curved side or rib portions disposed in the grooves in the tread. These members 28 are segmental and in the form shown in Fig. 10, the adjacent members are divided along a line extending centrally of adjacent parallel grooves. The dividing line or end edges of the members 28 at the edges of the tire extend normally to the edge of the tread and rib. Substantially centrally of the straight side of the members 28 is formed a lug projecting into a recess formed in the projections 27, which lug has a bolt hole 29 formed therethrough which extends in alinement with holes through the tread and through the rim and the flanges on the wheel corresponding to flanges 12 and 14. It may be here stated that when the narrow wheel is used, as shown in Figs. 10 and 11, the disks on the wheel will both be in the form shown as disk 11 in Fig. 2. Holes are also formed through the members 28 at the end edges thereof half of the holes being disposed in one member and half in another, these holes being shown as located at the intersection of the straight and curved portions at the end of said member 28. These holes also aline with holes extending through the tread member and disk flanges on the wheel and all of the parts are held together by the bolts 30 extending through said holes.

In the modification shown in Fig. 11, the securing members for the tread are shown as 31. These members are, in every respect, like members 28 except that the members have their end portions extending along the centers of adjacent grooves. The members 31 also have lugs projecting centrally in the straight side of the projections 27, which lugs are provided with the holes 32 corresponding to the holes 29 in the form shown in Fig. 10. Both the members 28 and 31 have their sides bent downward at a right angle and disposed flush with the edge of the wheel rim 33 which corresponds with the wheel rim 15 shown in Figs. 1, 2 and 5. The sides of members 28 and 31 thus extend at the sides of the flanges on the tread member 26.

It is also contemplated to use a tread member in the form of an integral ring or annulus such as shown at 34 in Fig. 8. This tread member can be formed with projections either as shown in Fig. 3 or as shown in Figs. 10 and 11. It is also contemplated to use a securing member disposed in the grooves of the tread member which is also in the form of an integral ring or annulus, as shown at 35 in Fig. 9. This member will be formed to fit in the grooves of the tread whether they be of the form shown in Fig. 3 or in the form shown in Figs. 10 and 11.

In assembling the wheel the tread shown in Figs. 10 and 11 will be split at one point and the same will be placed on the rim and the members 28 or 31 placed thereon and the securing bolts then inserted and tightened. The rim used will be provided with the separate segments shown in Figs. 1 and 2 and the structure of the wheel and the operation thereof will be the same as already described, except in the difference in the tread and securing members.

If a continuous tread, such as shown in Fig. 8, be used, the same will be compressed and collapsed somewhat and inserted into the ring 35 shown in Fig. 9. The tread will then be allowed to resume its circular shape and the projections thereon will be disposed between the ribs of the securing member 35. The tread can now be pushed laterally over the rim and the parts secured together, as already described. In order, however, to secure a tight fit between the tread and rim, it is contemplated to insert the rim into the tread after the securing member is in place thereon by having the rim collapsed slightly with its ends overlapping. The rim can then be expanded until its ends come into abutting relation. During this expansion it will be brought into very firm contact with the inner side of the tread. The rim can then be pressed laterally onto the flanges 12 and 14 of the wheel disks and the securing bolts inserted and tightened. A very secure and compact wheel structure is thus provided. With the continuous tread 34 and securing means 35, any filling of the wheel would, of course, have to be done through a side opening in the disks which would then be provided. The tread 34 would, of course, be used with the segmental securing members.

From the above description it is seen that applicant has provided a very simple and efficient wheel for the purpose intended. The tread portion 16 can readily be molded in the form required and this tread quickly assembled with the other parts, which are few in number and conveniently made and assembled. The curved form of the grooves 19 prevents the grooves from picking up straight sticks, stones, and other objects and also eliminates any chance of the grooves becoming wedged on railway tracks. At the same time, the tread line is always formed across the wheel so that there is no bumping of the wheel as it rolls on the ground. In the form shown in Figs. 3 to 7, the projections on the wheel are symmetrically arranged and there is no tendency for the wheel to be moved to one side or the other by the inclined grooves. In the form shown in Figs. 10 and 14, any tendency to move to one side caused by one set of grooves is counter-acted by the reversely extending grooves so that the wheel moves forward in a straight path.

It will, of course, be understood, that various changes may be made in the form, details, arrangement and proportions of the parts without departing from the scope of applicant's invention, which, generally stated, consists in a device capable of carrying out the objects above set forth, such as shown and described and defined in the appended claims.

What is claimed is:

1. A wheel structure having in combination, a hub having spaced annular flanges, spaced disks having inner flanges secured, respectively, to said flanges and having outer circumferentially extending flanges substantially parallel to the axis of the said wheel, a rim overlying said outer flanges having a separate segmental section therein, a split tread on said rim, fastening means overlying said tread, and securing means passing through said means, tread, rim and outer flanges for holding said parts together.

2. A wheel and tread structure comprising a rim, a tread member overlying the same having grooves formed therein in the shape of oppositely and reversely disposed substantially circular arcs joined at the center of said tread by straight portions.

3. A wheel and tread structure comprising a rim, a tread member overlying the same having grooves formed therein in the shape of oppositely disposed curved pointed arches having their points directed inwardly from the sides of said tread, the points of the oppositely disposed arches being joined by straight transverse portions.

4. The structure set forth in claim 3, the remote sides of adjacent arches at one side of said tread being formed substantially in a circular arc having its center located substantially at the outer edge of said rim.

5. A wheel and tread structure comprising a rim, a tread member overlying the same having centrally disposed and laterally disposed blocks projecting therefrom, said centrally disposed blocks having laterally directed points with concave sides and said laterally disposed blocks being substantially triangular in shape with outer straight bases and convex sides, said blocks being separated by grooves having straight central portions and reversely disposed curved outer portions.

6. The structure set forth in claim 5, and an openwork member disposed in said grooves and bolted through said tread to said rim.

7. A tread attachment for a wheel rim comprising reversely arranged projections extending radially therefrom, said projections being divided by intersecting grooves extending substantially diagonally across said tread surface but having straight central portions and reversely curved portions at each side thereof.

8. The structure set forth in claim 7, and an openwork plate disposed in said grooves adapted to hold said tread in place.

9. A wheel and tread structure comprising a rim, a tread member overlying the same having centrally disposed and laterally disposed projections thereon divided by intersecting grooves extending in a general diagonal line across said tread, said grooves having transverse straight central portions and reversely disposed curved portions at each end thereof, said tread also having a flange extending along each side outward of said projections, and segmental openwork metal sections having oppositely extended ribs fitting in said grooves and over said flanges and having side flanges fitting over the side edges of said tread, and means for securing said tread and openwork sections to said rim.

10. A tread device adapted for a wheel rim comprising a flat body having reversely arranged projections extending radially therefrom, said projections being divided by curved intersecting grooves extending substantially diagonally across said tread surface, said tread being divided transversely and the portions thereof adjacent said division being formed with beveled projecting ends adapted to overlap when said tread is in assembled position.

11. The structure set forth in claim 7, said tread being split transversely and one end thereof having a central projecting tongue forwardly beveled and extending under the adjacent portion of the other end and said latter end having laterally projecting tongues forwardly beveled and extending under the adjacent portion of said first mentioned end.

12. A tread device for a wheel rim having a flat body with projections extending radially therefrom separated by curved grooves extending across said tread in a general diagonal direction.

13. A tread device for a wheel rim having a flat body with projections extending radially therefrom separated by intersecting oppositely extending curved grooves, each of said grooves extending across said tread in general diagonal direction and comprising reversely curved portions with a short joining portion.

14. A wheel structure having in combination, a hub having spaced annular flanges, spaced disks having inner flanges secured, respectively, to said flanges and having outer circumferentially extending flanges substantially parallel to the axis of said wheel, a rim overlying said outer flanges, a tread surrounding said rim having curved grooves therein, and an openwork member disposed in said grooves, said openwork member, tread, rim and outer flanges all being secured by a common fastening means.

15. A tread member for a wheel rim comprising a flat body portion adapted to overlie said rim and having projections thereon divided by curved grooves, said projections being in the form of inwardly pointed figures having straight bases parallel with the edge of said rim, adjacent projections along the rim having pointed projections extending therebetween, the points of said last mentioned projections being disposed oppositely to the points of said first mentioned projections.

16. A wheel structure having in combination, a hub having spaced annular flanges, spaced disks having inner portions secured, respectively, to said flanges and having outer circumferentially extending flanges substantially parallel to the axis of said wheel, a rim overlying said outer flanges and a tread surrounding said rim, said rim and tread overlying said flanges and means passing through said tread and rim for securing said rim and circumferentially extending flanges together.

17. A wheel structure having in combination, a hub having spaced annular flanges, spaced disks having inner flanges secured, respectively, to said flanges and having outer circumferentially extending flanges substantially parallel to the axis of said wheel, a rim overlying said outer flanges, a tread surrounding said rim having diagonally extending grooves therein, a securing member for said tread disposed in said grooves, said securing member, tread member, and outer flanges all being secured by a common fastening means.

18. A wheel structure having in combination, a hub having spaced annular flanges, spaced disks having inner flanges secured, respectively, to said flanges and having outer circumferentially extending flanges, a rim overlying said outer flanges and secured thereto, and a tread surrounding said rim, said tread having a thick central portion and thinner edge portions overlying said flanges and means passing through said edge portions, flanges and rim for securing the same together.

19. A tread device for a tractor wheel comprising a flat band of resilient material of substantially 360° extent, said band having a central portion with a multiplicity of transversely and oppositely extending grooves in its tread surface, said grooves extending in a general diagonal direction across said surface, said tread being divided and having its edges adjacent said division beveled and disposed in overlapping relation.

20. A tread attachment for a wheel having a rim comprising a substantially cylindrical flexible flat tread device of yielding material, said device having on its tread surface oppositely extending diagonal intersecting grooves forming symmetrically arranged projections therebetween said device being divided at one point and adapted to be wrapped around said rim and circumferentially spaced means passing through said tread and securing the same to said rim.

21. A tread attachment for an automotive wheel comprising a flat tread device of flexible resilient material of substantially 360 degrees in extent, said device being divided at one point and having on its outer surface a plurality of oppositely and diagonally extending intersecting grooves forming symmetrically arranged projections therebetween and having a flange free from said projections along its edges.

In testimony whereof I affix my signature.

LUTHER B. BARTH.